US011171538B2

United States Patent
Sugimori

(10) Patent No.: US 11,171,538 B2
(45) Date of Patent: Nov. 9, 2021

(54) MOTOR DEVICE

(71) Applicant: JTEKT CORPORATION, Osaka (JP)

(72) Inventor: Genta Sugimori, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 157 days.

(21) Appl. No.: 16/511,213

(22) Filed: Jul. 15, 2019

(65) Prior Publication Data
US 2020/0028405 A1    Jan. 23, 2020

(30) Foreign Application Priority Data

Jul. 17, 2018  (JP) .............................. JP2018-134391

(51) Int. Cl.
*H02K 5/22*     (2006.01)
*H02K 11/215*   (2016.01)
(Continued)

(52) U.S. Cl.
CPC ........... *H02K 5/225* (2013.01); *B62D 5/0403* (2013.01); *B62D 5/046* (2013.01); *B62D 5/0412* (2013.01); *B62D 5/0421* (2013.01); *H02K 5/10* (2013.01); *H02K 5/161* (2013.01); *H02K 11/215* (2016.01); *H02K 11/33* (2016.01)

(58) Field of Classification Search
CPC ........ H02K 11/00; H02K 11/20; H02K 11/21; H02K 11/215; H02K 11/30; H02K 11/33; H02K 5/00; H02K 5/10; H02K 5/16; H02K 5/161; H02K 5/22; H02K 5/225; B62D 5/00; B62D 5/04; B62D 5/0403; B62D 5/041; B62D 5/0412; B62D 5/042;
(Continued)

(56) References Cited

U.S. PATENT DOCUMENTS 5,925,997 A *  7/1999 Yamaoka ............... H02H 5/083
                                                    318/483
6,337,550 B1 * 1/2002 Takahashi .................. B60J 1/17
                                                    318/286
(Continued)

FOREIGN PATENT DOCUMENTS

DE    102015226506 A1    6/2016
DE    112015005612 T5    9/2017
(Continued)

OTHER PUBLICATIONS

Dec. 17, 2019 Search Report issued in European Application No. 19186495.

*Primary Examiner* — Tran N Nguyen
(74) *Attorney, Agent, or Firm* — Oliff PLC

(57) ABSTRACT

Provided is a motor device capable of detecting entry of water into a housing before a control circuit is submerged. A first motor bus bar includes a first U-phase motor bus bar, a first V-phase motor bus bar, and a first W-phase motor bus bar. A first control circuit is connected to the first motor bus bar. The first U-phase motor bus bar, the first V-phase motor bus bar, and the first W-phase motor bus bar are disposed on the lower side with respect to the first control circuit in a gravity direction. The first control circuit detects entry of water into a motor housing of the motor device, based on the status of power supply to the first U-phase motor bus bar, the first V-phase motor bus bar, and the first W-phase motor bus bar.

5 Claims, 6 Drawing Sheets

(51) Int. Cl.
*H02K 11/33* (2016.01)
*B62D 5/04* (2006.01)
*H02K 5/10* (2006.01)
*H02K 5/16* (2006.01)

(58) Field of Classification Search
CPC .... B62D 5/0421; B62D 5/0424; B62D 5/046; B62D 5/048; B62D 5/0481
See application file for complete search history.

(56) References Cited

U.S. PATENT DOCUMENTS

| | | | |
|---|---|---|---|
| 2008/0211357 A1* | 9/2008 | Kataoka | H02K 11/215 310/68 B |
| 2016/0181885 A1 | 6/2016 | Yamasaki | |
| 2016/0352190 A1* | 12/2016 | Hieda | H02K 11/215 |

FOREIGN PATENT DOCUMENTS

| | | |
|---|---|---|
| EP | 2031736 A2 | 3/2009 |
| EP | 3144206 A1 | 3/2017 |
| JP | 2016-119799 A | 6/2016 |

* cited by examiner

MOTOR DEVICE

INCORPORATION BY REFERENCE

The disclosure of Japanese Patent Application No. 2018-134391 filed on Jul. 17, 2018 including the specification, drawings and abstract, is incorporated herein by reference in its entirety.

BACKGROUND OF THE INVENTION

1. Field of the Invention

The invention relates to a motor device.

2. Description of the Related Art

There are motor devices that include a motor case accommodating a motor and a microcomputer for controlling power supply to the motor through an inverter. See, for example, Japanese Patent Application Publication No. 2016-119799 (JP 2016-119799 A). The inverter and a winding of the motor are connected by a motor line. The microcomputer, the inverter, and the motor line are disposed on the same substrate. In some cases, water enters the motor case due to various factors such as a reduction in sealing performance of the motor case. According to JP 2016-119799 A, an abnormality detection circuit of a microcomputer detects entry of water into a motor case, by detecting a change in resistance between a motor line and the motor case.

However, JP 2016-119799 A only describes that a structure for detecting entry of water into the motor case is provided inside the motor case, and does not take into account how the structure for detecting entry of water into the motor case is arranged with respect to the gravity direction. Therefore, if the microcomputer is submerged first due to the effect of gravity, it may become impossible to control the motor through fail-safe processing or the like.

SUMMARY OF THE INVENTION

An object of the present invention is to provide a motor device capable of detecting entry of water into a housing before a control circuit is submerged.

According to an aspect of the present invention, there is provided a motor device that includes: a motor including a rotary shaft; motor bus bars of a plurality of phases that serve as power supply paths to the motor; a control circuit that controls power supply to the motor through the motor bus bars; and a housing that accommodates the motor bus bars and the control circuit; wherein predetermined motor bus bars of at least two of the plurality of phases are disposed on a lower side with respect to the control circuit in a gravity direction when the motor device is mounted on a mounting target; and the control circuit includes a water entry detection circuit that detects entry of water into the housing, based on a change in a status of power supply to the predetermined motor bus bars.

When water enters the housing of the motor device, the water moves down in the gravity direction in the housing due to the effect of gravity. According to the above configuration, the motor device has an arrangement for detecting entry of water into the housing in consideration of the gravity direction. When a considerable amount of water enters the housing, the predetermined motor bus bars of at least two phases disposed on the lower side with respect to the control circuit in the gravity direction are submerged before the control circuit is submerged. Therefore, by recognizing a change in the status of power supply to the predetermined motor bus bars, the water entry detection circuit can detect entry of water into the motor device before the control circuit is submerged. Thus, since entry of water into the motor device can be detected before the control circuit is submerged, it is possible to control driving of the motor even after detection of entry of water. Therefore, for example, a control operation such as fail-safe processing can be executed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
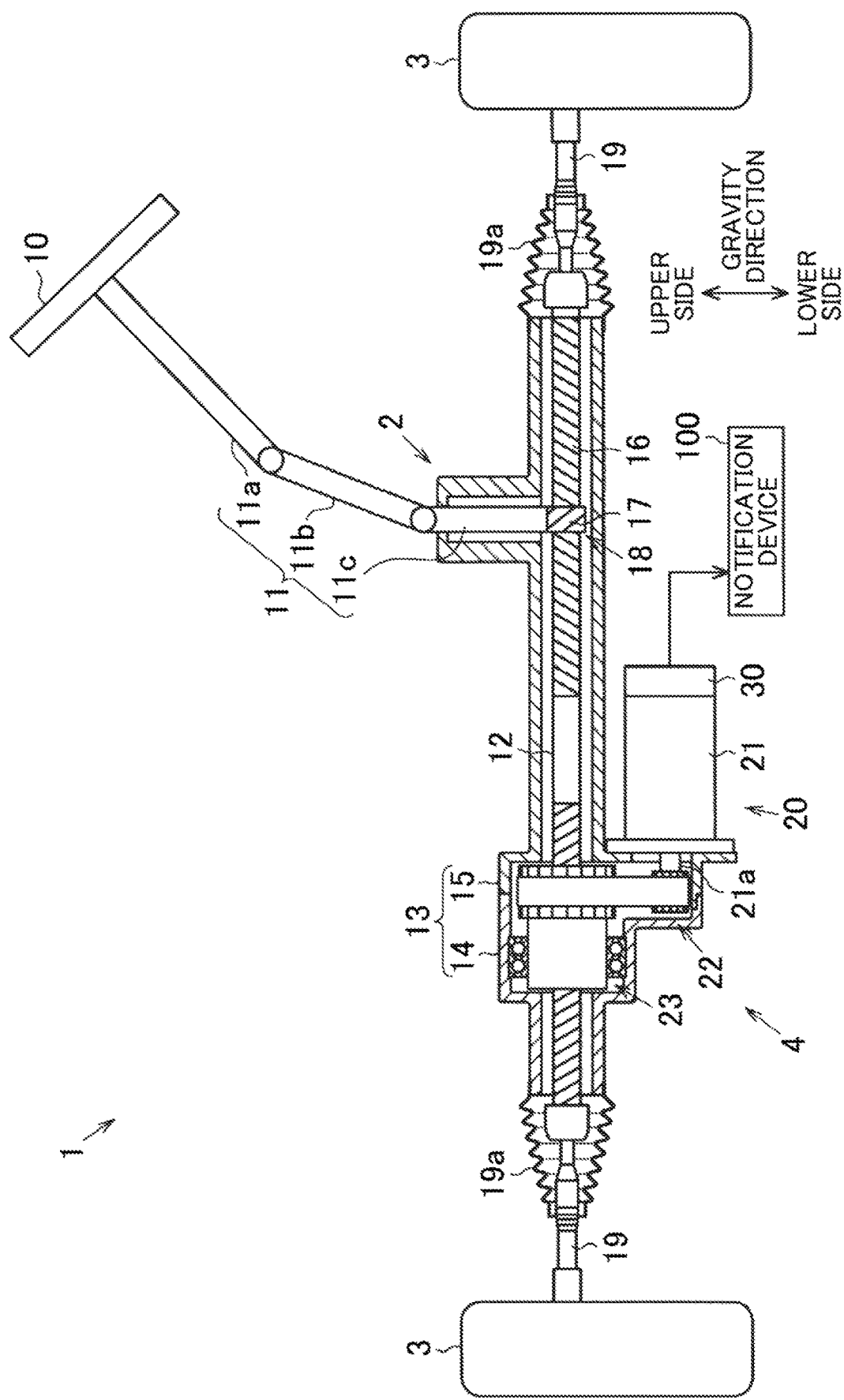
FIG. 1 is a block diagram illustrating the schematic configuration of a steering system.

An embodiment of a motor device of the present invention installed in an electric power steering system (hereinafter referred to as an "EPS") will be described. As illustrated in FIG. 1, an EPS 1 includes a steering mechanism 2 that steers steered wheels 3 in response to a driver's operation of a steering wheel 10, and an actuator 4 including a motor device 20 to apply assist force for assisting the driver in steering to the steering mechanism 2.

The steering mechanism 2 includes a steering shaft 11 to which the steering wheel 10 is coupled, a rack shaft 12 that reciprocates in an axial direction in accordance with the rotation of the steering shaft 11, and a rack housing 13 serving as a housing through which the rack shaft 12 is inserted so as to be reciprocally movable. The steering shaft 11 includes a column shaft 11a coupled to the steering wheel 10, an intermediate shaft 11b coupled to the lower end of the column shaft 11a, and a pinion shaft 11c coupled to the lower end of the intermediate shaft 11b. The rack housing 13 is formed by coupling a first rack housing 14 and a second rack housing 15 each having a cylindrical shape. The rack shaft 12 and the pinion shaft 11c are arranged at a predetermined crossing angle relative to each other in the second rack housing 15. Rack teeth 16 formed on the rack shaft 12 and pinion teeth 17 formed on the pinion shaft 11c mesh with each other, thereby forming a rack-and-pinion mechanism 18.

Tie rods 19 are coupled to the opposite ends of the rack shaft 12. The distal ends of the tie rods 19 are connected to knuckles to which the steered wheels 3 are attached. Cylindrical bellow rack boots 19a are provided, each between one of the axial ends of the rack housing 13 and one of the tie rods 19. The rack boots 19a minimize entry of foreign matters such as water into the rack housing 13. In the EPS 1, the rotary motion of the steering shaft 11 in accordance with a steering operation is converted into an axial reciprocating linear motion of the rack shaft 12 via the rack-and-pinion mechanism 18. The axial reciprocating linear motion is transmitted to the knuckles via the tie rods 19, so that the steered angle of the steered wheels 3, that is, the traveling direction of the vehicle is changed.

The actuator 4 includes the motor device 20 having a motor 21 serving as a drive source, a belt transmission mechanism 22 that transmits rotation of a rotary shaft 21a of the motor 21, and a ball screw mechanism 23 that converts the rotary motion transmitted by the belt transmission mechanism 22 into a reciprocating motion of the rack shaft 12. The belt transmission mechanism 22 and the ball screw mechanism 23 form a transmission mechanism. The motor device 20 is disposed on the lower side with respect to the rack shaft 12 in the gravity direction. The motor device 20 is disposed outside the cabin, and is coupled to a lower part of the rack housing 13, which is an attachment target, in the gravity direction. The rotary shaft 21a of the motor 21 is arranged in parallel to the rack shaft 12. To be exact, the rotary shaft 21a of the motor 21 is slightly tilted from the parallel orientation due to the tension of a belt of the belt transmission mechanism 22.

In the present embodiment, the gravity direction is orthogonal to the rotary shaft 21a of the motor 21. The actuator 4 is disposed at a joint between the first rack housing 14 and the second rack housing 15. The actuator 4 transmits the rotary motion of the rotary shaft 21a of the motor 21 to the ball screw mechanism 23 via the belt transmission mechanism 22, and converts the rotation to a reciprocating linear motion of the rack shaft 12 via the ball screw mechanism 23, thereby applying assist force to the steering mechanism 2. As assist force is applied to the steering mechanism 2, the driver is assisted in steering.

The motor device 20 includes an electronic control device 30 that controls power supply to the motor 21. The vehicle is equipped with a notification device 100. The notification device 100 is, for example, a warning light provided on the instrumental panel. The notification device 100 is connected to the electronic control device 30. The electronic control device 30 turns on the notification device 100 when an abnormality occurs.

Figure 2:
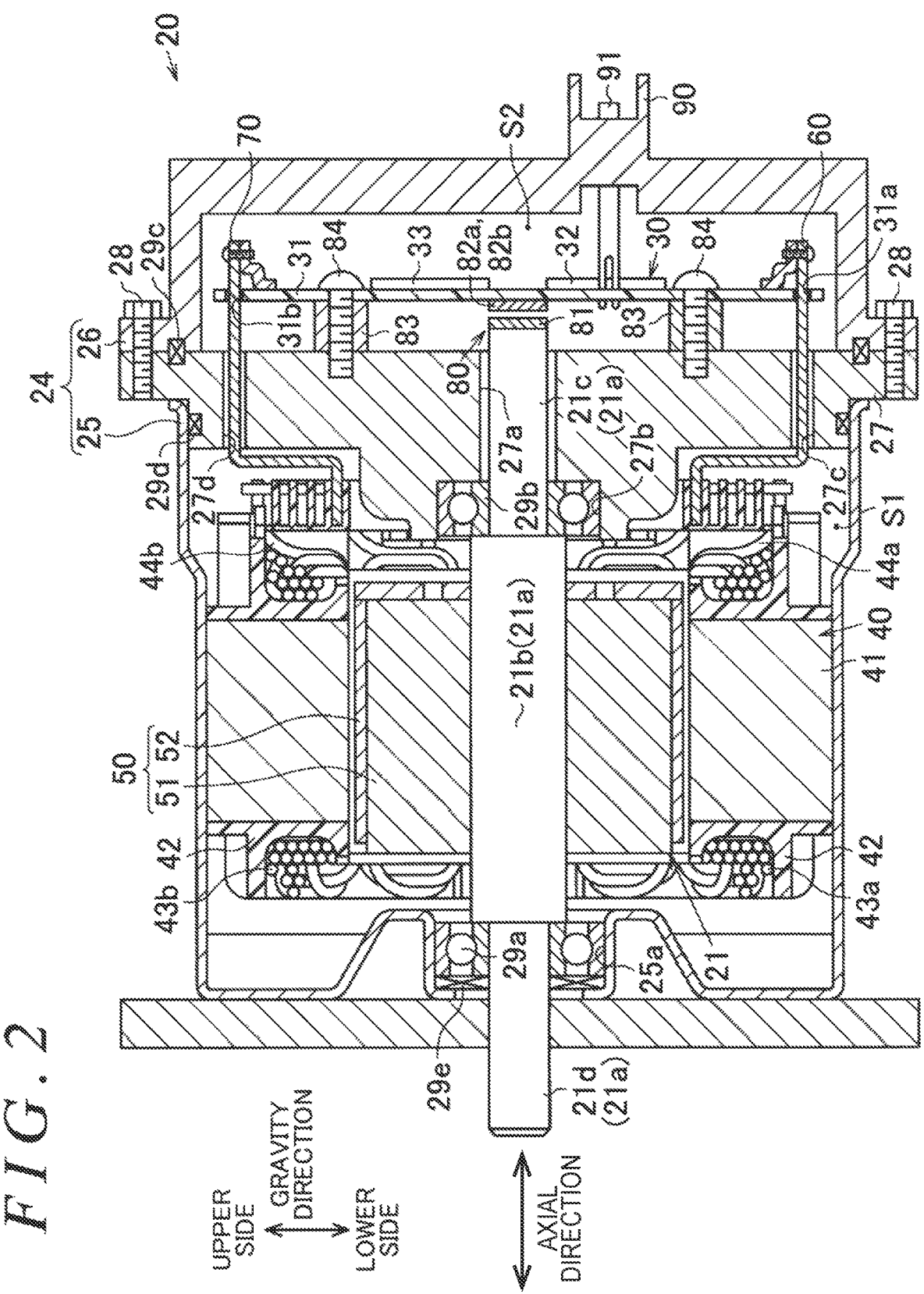
FIG. 2 is a schematic configuration diagram illustrating a motor device.

The following describes the motor device 20. As illustrated in FIG. 2, the motor device 20 includes a motor housing 24 serving as a housing that accommodates the motor 21 and the electronic control device 30.

The motor housing 24 includes a bottomed cylindrical first motor housing 25 with an opening and a bottomed cylindrical second motor housing 26 with an opening. The first motor housing 25 and the second motor housing 26 are split in the direction orthogonal to the gravity direction when the motor device 20 is installed in the EPS 1. A heatsink 27 is disposed inside the motor housing 24. The heatsink 27 fits to the opening of the first motor housing 25. Further, the heatsink 27 is attached to the second motor housing 26 in a manner such that the opening of the second motor housing 26 faces the heatsink 27 (the opening of the first motor housing 25). The heatsink 27 and the second motor housing 26 are fixed to each other by bolts 28 at their annular flange portions provided on their outer peripheral surfaces. A first seal portion 29c is provided between an annular recess in the flange portion of the heatsink 27 and an annular recess in the flange portion of the second motor housing 26. The first seal portion 29c minimizes entry of foreign matters such as water into the motor housing 24.

The first seal portion 29c is, for example, an O-ring. A second seal portion 29d is provided between an annular recess in the outer peripheral surface of the heatsink 27 and the inner peripheral surface of the first motor housing 25. The second seal portion 29d minimizes entry of foreign matters such as water into the motor housing 24. The heatsink 27 and the inner surface of the first motor housing 25 enclose and define a first space S1. The heatsink 27 and the inner surface of the second motor housing 26 enclose and define a second space S2.

The first space S1 in the first motor housing 25 accommodates the motor 21. The motor 21 is a three-phase brushless motor. The motor 21 includes a cylindrical stator 40 fitted to the inner peripheral surface of the first motor housing 25, and a cylindrical rotor 50 fitted to the outer periphery of the rotary shaft 21a and disposed on the inner circumferential side of the stator 40 with a clearance therebetween. The rotary shaft 21a is disposed to extend through a through hole 27a that is formed in the heatsink 27 such that the through hole 27a connects the first space S and the second space S2. A second end of the rotary shaft 21a on the second motor housing 26 side in FIG. 2 is located in the second space S2. A first end of the rotary shaft 21a on the side opposite to the second motor housing 26 in FIG. 2 is located outside the first motor housing 25. The rotary shaft 21a includes a large diameter portion 21b, a second small diameter portion 21c, and a first small diameter portion 21d. The large diameter portion 21b is interposed between the second small diameter portion 21c and the first small diameter portion 21d in the axial direction. The second small diameter portion 21c is located on the second motor housing 26 side with respect to the large diameter portion 21b. The first small diameter portion 21d is located on the side opposite to the second motor housing 26 with respect to the large diameter portion 21b. A second bearing 29b is disposed between the second small diameter portion 21c and a recess 27b in the through hole 27a in the heatsink 27. The second bearing 29b rotatably supports the second small diameter portion 21c with respect to the heatsink 27.

The first motor housing 25 has a recess 25a at the bottom. A first bearing 29a and a third seal portion 29e are disposed between the first small diameter portion 21d and the inner peripheral surface of the recess 25a. The first bearing 29a rotatably supports the first small diameter portion 21d with respect to the first motor housing 25. The third seal portion 29e is, for example, a lip seal. The third seal portion 29e minimizes entry of foreign matters such as water into the first motor housing 25. Due to the sealing properties of the first seal portion 29c, the second seal portion 29d, and the third seal portion 29e, the motor housing 24 has a watertight structure that is more waterproof than the watertight structure of the rack housing 13 implemented by the rack boots 19a. The rack boots 19a are less waterproof than the motor housing 24.

The rotor 50 includes a cylindrical rotor core 51 that is fixed to the large diameter portion 21b of the rotary shaft 21a so as to be rotatable therewith, and a plurality of permanent magnets 52 fixed to the outer periphery of the rotor core 51. The permanent magnets 52 are fixed to the outer periphery of the rotor core 51 such that different magnetic poles (N poles and S poles) are alternately arranged in the circumferential direction of the rotor core 51.

The stator 40 includes a stator core 41, insulators 42, and coils. The coils include a first motor coil 43a, and a second motor coil 43b. The stator core 41 is fixed to the inner peripheral surface of the first motor housing 25. The first motor coil 43a and the second motor coil 43b are wound around the stator core 41 with the respective insulators 42 interposed therebetween.

Figure 3:
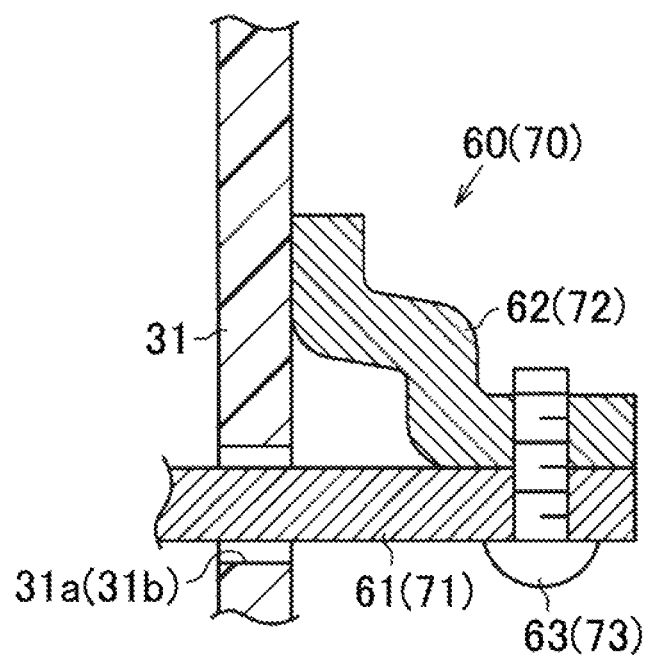
FIG. 3 is a schematic configuration diagram illustrating the connection structure between a motor bus bar and a circuit board.

The motor device 20 includes a first motor bus bar 60 and a second motor bus bar 70. As illustrated in FIGS. 2 and 3, the first motor bus bar 60 includes a main body portion 61 and a connection portion 62 that connects a second end of the main body portion 61 on the bottom side of the second motor housing 26 to a circuit board 31. A first end of the main body portion 61 of each of the phases (U-phase, V-phase, and W-phase) on the side opposite to the second end is located in the first space S1. The first end of the main body portion 61 of each phase is connected to an end 44a of the first motor coil 43a of the corresponding phase. The main body portion 61 includes a first portion connected to the end 44a, a second portion extending through a first through hole 27c formed in the heatsink 27, a third portion connecting the first portion connected to the end 44a and the second portion extending through the first through hole 27c.

There are three first through holes 27c that extend through the heatsink 27 to connect the first space S1 and the second space S2. The first through holes 27c extend in the direction orthogonal to the gravity direction. The first portion extends in the direction orthogonal to the gravity direction. The third portion connects the first portion and the second portion, and extends in the gravity direction. The second portion extends in the direction orthogonal to the gravity direction. The second portion extends through the first through hole 27c of the corresponding phase. The second portion is disposed to extend through a second through hole 31a in the circuit board 31. There are three second through holes 31a that extend through the circuit board 31 in the direction orthogonal to the gravity direction. The second portion extends in the direction orthogonal to the gravity direction.

The second end of the main body portion 61 is located in the second space S2. The first end of the connection portion 62 on the side opposite to the bottom of the second motor housing 26 is fixed to the circuit board 31 by soldering or the like. The circuit board 31 and the first end of the connection portion 62 are connected at the lowermost point of the circuit board 31 in the gravity direction. The lowermost point is a part of the circuit board 31 near its lowermost position in the gravity direction. The second end of the connection portion 62 on the side opposite to the first end and the second end of the main body portion 61 are fixed by a bolt 63.

The second motor bus bar 70 of each phase includes a main body portion 71 and a connection portion 72 that connects a second end of the main body portion 71 on the bottom side of the second motor housing 26 to the circuit board 31. The second end of the connection portion 72 and the second end of the main body portion 71 are fixed by a bolt 73. The main body portion 71 includes a first portion connected to an end 44b of the second motor coil 43b of the corresponding phase, a second portion extending through a third through hole 27d formed in the heatsink 27, a third portion connecting the first portion connected to the end 44b and the second portion extending through the third through hole 27d. The third portion of the main body portion 71 of each phase is disposed to extend through a corresponding one of three third through holes 27d formed in the heatsink 27 so as to connect the first space S1 and the second space S2, and a corresponding one of three fourth through holes 31b formed in the circuit board 31. The second motor bus bar 70 has the same configuration as the first motor bus bar 60. The first motor bus bar 60 is disposed on the lower side with respect to the second motor bus bar 70 in the gravity direction.

As illustrated in FIG. 2, a connector 90 that fits to a connector of an external power supply is disposed at the bottom of the second motor housing 26. A connection terminal 91 extending through the bottom of the second motor housing 26 is inserted through the connector 90. The electronic control device 30 is accommodated in the second space S2. The electronic control device 30 includes the circuit board 31. The circuit board 31 is arranged such that its surface extends orthogonally with respect to the rotary shaft 21a of the motor 21. An end of the connection terminal 91 is connected to an external power supply. Another end of the connection terminal 91 is inserted into a through hole (not illustrated) formed in the circuit board 31 and fixed by soldering or the like.

The electronic control device 30 includes the circuit board 31 and a rotation angle detection circuit 80. The rotation angle detection circuit 80 includes a magnet 81 and magnetic sensors 82a and 82b. The magnet 81 is attached to an end of the second small diameter portion 21c on the side opposite to the large diameter portion 21b. The magnetic sensors 82a and 82b are attached to an end face of the circuit board 31 on the second small diameter portion 21c side. The magnetic sensors 82a and 82b face the magnet 81 with a clearance therebetween in the axial direction of the rotary shaft 21a. The magnetic sensors 82a and 82b generate an electric signal corresponding to the magnetic field that changes with the rotation of the magnet 81. The electric signal is used to calculate the rotation angle of the rotary shaft 21a of the motor 21.

The circuit board 31 is fixed to the heatsink 27 by spacers 83 and bolts 84. The circuit board 31 is made of a resin material or the like, and has a rectangular flat plate shape. The electronic control device 30 includes a first control circuit 32 and a second control circuit 33.

The first control circuit 32 includes a microcomputer and a drive circuit. The microcomputer calculates the control amount for controlling the power supply to the motor 21, based on an electric signal from the rotation angle detection circuit 80 (magnetic sensor 82a) or the like. The drive circuit converts direct current (DC) power supplied from the external power supply into a three-phase alternating current (AC) power, and supplies the power to the motor 21, based on the control amount calculated by the microcomputer. The first control circuit 32 is connected to the first motor bus bar 60. The first control circuit 32 controls power supply to the first motor coil 43a through the first motor bus bar 60.

The second control circuit 33 includes a microcomputer and a drive circuit. The microcomputer calculates the control amount for controlling the power supply to the motor 21, based on an electric signal from the rotation angle detection circuit 80 (magnetic sensor 82b) or the like. The drive circuit converts DC power supplied from the external power supply into a three-phase AC power, and supplies the power to the motor 21, based on the control amount calculated by the microcomputer. The second control circuit 33 is connected to the second motor bus bar 70. The second control circuit 33 controls power supply to the second motor coil 43b through the second motor bus bar 70.

The first control circuit 32 includes a communication unit for sharing information with the second control circuit 33. The second control circuit 33 includes a communication unit for sharing information with the first control circuit 32. The communication unit of the first control circuit 32 and the communication unit of the second control circuit 33 communicate with each other, so that information held by the first control circuit 32 and information held by the second control circuit 33 are shared with each other.

The first control circuit 32 is disposed on the lower side with respect to the second control circuit 33 in the gravity direction. The first motor bus bar 60 is disposed on the lower side with respect to the first control circuit 32 and the second control circuit 33 in the gravity direction. The first motor bus bar 60 is disposed on the lower side with respect to the first motor coil 43a in the gravity direction. The first motor bus bar 60 is disposed on the outer side with respect to the first motor coil 43a in the radial direction of the rotary shaft 21a. The second motor bus bar 70 is disposed on the upper side with respect to the second motor coil 43b in the gravity direction. The second motor bus bar 70 is disposed on the outer side with respect to the second motor coil 43b in the radial direction of the rotary shaft 21a.

Figure 4:
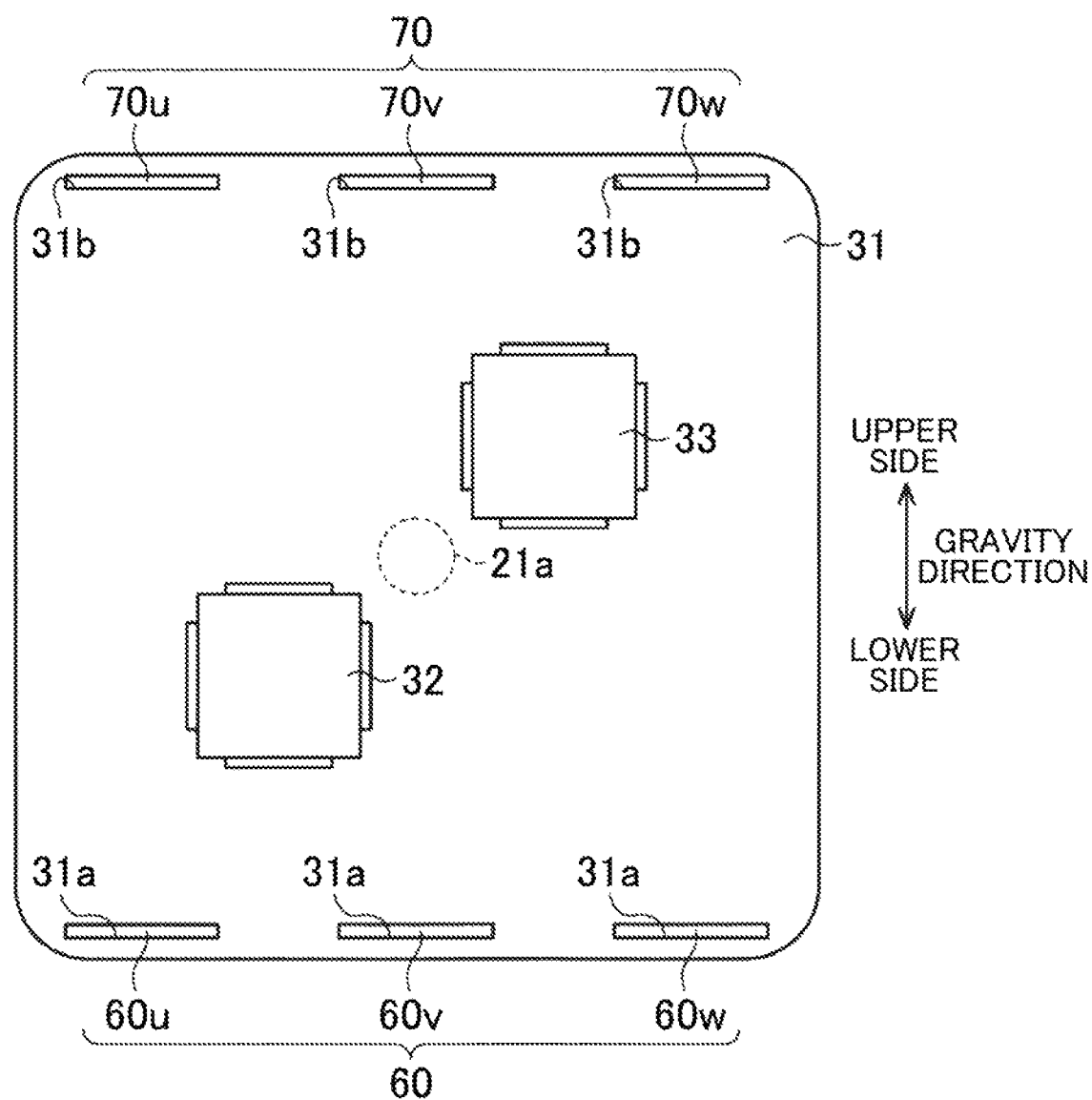
FIG. 4 is a schematic configuration diagram illustrating control circuits mounted on the circuit board and the motor bus bars as viewed in the axial direction of a rotary shaft.

As illustrated in FIG. 4, the first motor bus bar 60 includes a first U-phase motor bus bar 60u, a first V-phase motor bus bar 60v, and a first W-phase motor bus bar 60w. The first U-phase motor bus bar 60u, the first V-phase motor bus bar 60v, and the first W-phase motor bus bar 60w are aligned in the direction orthogonal to the gravity direction. That is, the first U-phase motor bus bar 60u, the first V-phase motor bus bar 60v, and the first W-phase motor bus bar 60w are arranged at the same height in the gravity direction. The first U-phase motor bus bar 60u, the first V-phase motor bus bar 60v, and the first W-phase motor bus bar 60w are connected to the first control circuit 32.

The second motor bus bar 70 includes a second U-phase motor bus bar 70u, a second V-phase motor bus bar 70v, and a second W-phase motor bus bar 70w. The second U-phase motor bus bar 70u, the second V-phase motor bus bar 70v, and the second W-phase motor bus bar 70w are aligned in the direction orthogonal to the gravity direction. That is, the second U-phase motor bus bar 70u, the second V-phase motor bus bar 70v, and the second W-phase motor bus bar 70w are arranged at the same height in the gravity direction. The second U-phase motor bus bar 70u, the second V-phase motor bus bar 70v, and the second W-phase motor bus bar 70w are connected to the second control circuit 33.

When viewed from the axial direction of the rotary shaft 21a, the first control circuit 32, the first U-phase motor bus bar 60u, the first V-phase motor bus bar 60v, and the first W-phase motor bus bar 60w are point-symmetric to the second control circuit 33, the second U-phase motor bus bar 70u, the second V-phase motor bus bar 70v, and the second W-phase motor bus bar 70w, about the rotary shaft 21a.

The first control circuit 32 includes a voltage monitoring circuit. That is, the voltage monitoring circuit is a voltage-dividing circuit connected to the first U-phase motor bus bar 60u, the first V-phase motor bus bar 60v, and the first W-phase motor bus bar 60w. The voltage monitoring circuit includes, for each phase, a pair of resistors connected in series. The second control circuit 33 stores a resistance value of each resistor of the voltage monitoring circuit. The first control circuit 32 obtains a first U-phase voltage value Vu1 of the first U-phase motor bus bar 60u, a first V-phase voltage value Vv1 of the first V-phase motor bus bar 60v, and a first W-phase voltage value Vw1 of the first W-phase motor bus bar 60w via the voltage monitoring circuit. The first control circuit 32 detects short circuits of the first U-phase motor bus bar 60u, the first V-phase motor bus bar 60v, and the first W-phase motor bus bar 60w, based on whether the relationship between the first U-phase voltage value Vu1, the first V-phase voltage value Vv1, and the first W-phase voltage value Vw1 is different from the usual relationship of three-phase AC in which the phases are shifted from one another by 120 degrees. That is, the first control circuit 32 detects short circuits of the first U-phase motor bus bar 60u, the first V-phase motor bus bar 60v, and the first W-phase motor bus bar 60w when at least two phases of the first U-phase voltage value Vu1, the first V-phase voltage value Vv1, and the first W-phase voltage value Vw1 remain at the same potential for a predetermined time period. The predetermined time period is set to a time period long enough to distinguish the above condition from a condition in which at least two phases are temporarily at the same potential in three-phase AC.

The second control circuit 33 includes a voltage monitoring circuit. The voltage monitoring circuit is a voltage-dividing circuit connected to the second U-phase motor bus bar 70u, the second V-phase motor bus bar 70v, and the second W-phase motor bus bar 70w. The voltage monitoring circuit includes, for each phase, a pair of resistors connected in series. The second control circuit 33 stores the resistance value of each resistor of the voltage monitoring circuit. The second control circuit 33 obtains a second U-phase voltage value Vu2 of the second U-phase motor bus bar 70u, a second V-phase voltage value Vv2 of the second V-phase motor bus bar 70v, and a second W-phase voltage value Vw2 of the second W-phase motor bus bar 70w via the voltage monitoring circuit. The second control circuit 33 detects short circuits of the second U-phase motor bus bar 70u, the second V-phase motor bus bar 70v, and the second W-phase motor bus bar 70w, based on whether the relationship between the second U-phase voltage value Vu2, the second V-phase voltage value Vv2, and the second W-phase voltage value Vw2 is different from the usual relationship of three-phase AC in which the phases are shifted from one another by 120 degrees. That is, the second control circuit 33 detects short circuits of the second U-phase motor bus bar 70u, the second V-phase motor bus bar 70v, and the second W-phase motor bus bar 70w when at least two phases of the second U-phase voltage value Vu2, the second V-phase voltage value Vv2, and the second W-phase voltage value Vw2 remain at the same potential for a predetermined time period.

When the first control circuit 32 detects a short circuit of the first motor bus bar 60, the first control circuit 32 turns on the notification device 100 that notifies of entry of water into the motor housing 24 or occurrence of a short circuit failure of the first motor bus bar 60, and executes fail-safe processing to stop driving of the motor 21 by, for example, stopping power supply to the first motor bus bar 60. When the first control circuit 32 detects a short circuit of the first motor bus bar 60, the first control circuit 32 transmits information indicating the detection of the short circuit of the first motor bus bar 60 to the second control circuit 33, through communication between the communication unit of the first control circuit 32 and the communication unit of the second control circuit 33.

When the second control circuit 33 detects a short circuit of the second motor bus bar 70, the second control circuit 33 turns on the notification device 100 that notifies of occurrence of a short circuit failure of the second motor bus bar 70, and executes fail-safe processing to stop driving of the motor 21 by, for example, stopping power supply to the second motor bus bar 70. When the second control circuit 33 detects a short circuit of the second motor bus bar 70, the second control circuit 33 transmits information indicating the detection of the short circuit of the second motor bus bar 70 to the first control circuit 32, through communication between the communication unit of the first control circuit 32 and the communication unit of the second control circuit 33. Then, for example, in the case of detecting entry of water into the motor housing 24 through detection of the short circuit of the first motor bus bar 60, if the second motor bus bar 70 operates normally, the second control circuit 33 continues to supply power to the second motor bus bar 70, thereby providing redundancy in controlling driving of the motor 21.

In the present invention, the first control circuit 32 includes a water entry detection circuit that detects entry of water into the motor housing 24, using a function of detecting a short circuit described above. Specifically, when water enters the motor housing 24, at least two phases of the first motor bus bar 60 are short-circuited. Thus, the first control circuit 32 detects entry of water into the motor housing 24 through detection of a short-circuit of the first motor bus bar 60.

Figure 5:
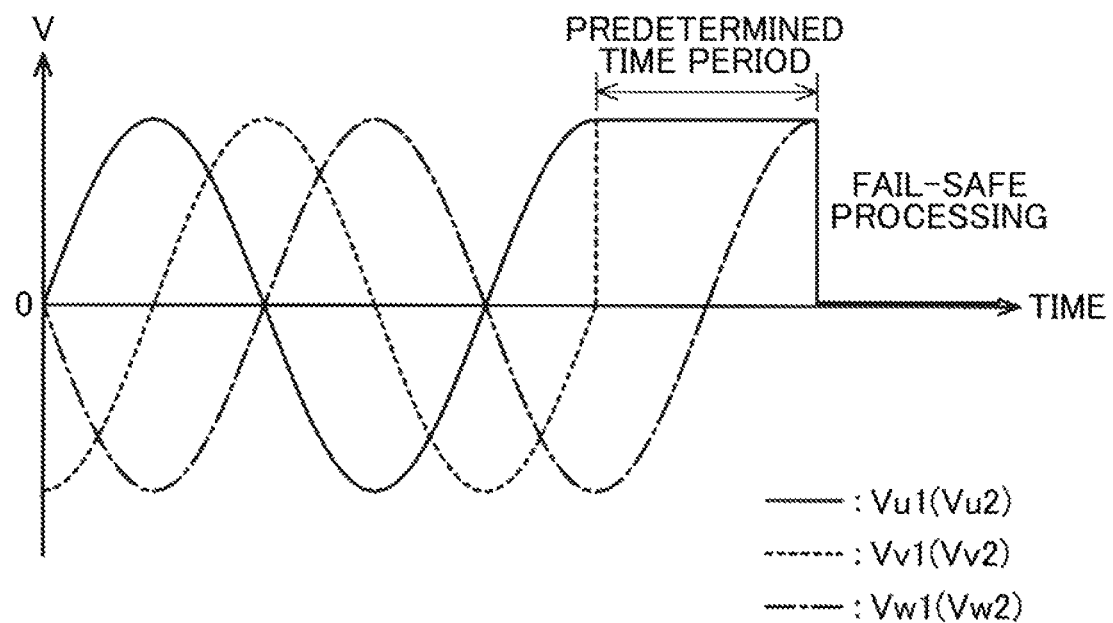
FIG. 5 is a graph illustrating the relationship between voltage values of motor bus bars of respective phases when the motor bus bars of two phases are short-circuited.

For example, FIG. 5 illustrates the relationship between the first U-phase voltage value Vu1, the first V-phase voltage value Vv1, and the first W-phase voltage value Vw1, or the relationship between the second U-phase voltage value Vu2, the second V-phase voltage value Vv2, and the second W-phase voltage value Vw2. In FIG. 5, for example, the relationship between the first U-phase voltage value Vu1, the first V-phase voltage value Vv1, and the first W-phase voltage value Vw1 is changed from the usual relationship of three-phase AC in which the phases are shifted from one another by 120 degrees to the relationship in which the first U-phase voltage value Vu1 and the first V-phase voltage value Vv1 remain at the same potential for a predetermined time period. A condition in which the first U-phase voltage value Vu1 and the first V-phase voltage value Vv1 are at the same potential often occurs temporarily. However, if such a condition continues for a long time, the relationship of the three-phase AC is not maintained.

Accordingly, the first control circuit 32 can detect short circuits of the first U-phase motor bus bar 60u and the first V-phase motor bus bar 60v, that is, short circuits thereof due to entry of water, when the first U-phase voltage value Vu1 and the first V-phase voltage value Vv1 remain at the same potential for a predetermined time period. The first control circuit 32 can also detect short circuits of the first U-phase motor bus bar 60u and the first W-phase motor bus bar 60w, that is, short circuits thereof due to entry of water, when the first U-phase voltage value Vu1 and the first W-phase voltage value Vw1 remain at the same potential for a predetermined time period. The first control circuit 32 can detect short circuits of the first V-phase motor bus bar 60v and the first W-phase motor bus bar 60w, that is, short circuits thereof due to entry of water, when the first V-phase voltage value Vv1 and the first W-phase voltage value Vw1 remain at the same potential for a predetermined time period.

Further, the first control circuit 32 can also detect short circuits of the first U-phase motor bus bar 60u, the first V-phase motor bus bar 60v, and the first W-phase motor bus bar 60w, that is, short circuits thereof due to entry of water, when the first U-phase voltage value Vu1, the first V-phase voltage value Vv1, and the first W-phase voltage value Vw1 remain at the same potential for a predetermined time period. In these cases, the first control circuit 32 executes fail-safe processing, so that the first U-phase voltage value Vu1, the first V-phase voltage value Vv1, and the first W-phase voltage value Vw1 become substantially "0". Thus, the first control circuit 32 and the second control circuit 33 can detect entry of water into the motor housing 24, based on a change in the status of power supply to the first motor bus bar 60.

The advantageous effects of the present embodiment will be described.

(1) Water may enter the motor housing 24 of the motor device 20 due to various factors. For example, water enters the motor housing 24 from a gap between the heatsink 27 and the second motor housing 26 due to a reduction in sealing performance of the first seal portion 29c or looseness of the bolts 28. When water enters the motor housing 24 of the motor device 20, the water moves down in the gravity direction in the motor housing 24 due to the effect of gravity.

The motor device 20 of the present embodiment employs an arrangement for detecting entry of water into the motor housing 24 in consideration of the gravity direction. That is, since the motor device 20 is installed in the EPS 1 such that the rotary shaft 21a is arranged in parallel to the rack shaft 12, water that has entered the motor housing 24 moves toward the wall surface of the motor housing 24 on the lower side of the gravity direction. When a considerable amount of water enters the motor housing 24, the first motor bus bar 60 disposed on the lower side with respect to the first control circuit 32 and the second control circuit 33 in the gravity direction is submerged before the first control circuit 32 and the second control circuit 33 are submerged. Then, at least two phases of the first U-phase motor bus bar 60u, the first V-phase motor bus bar 60v, and the first W-phase motor bus bar 60w are short-circuited.

The first control circuit 32 recognizes the first U-phase voltage value Vu1 of the first U-phase motor bus bar 60u, the first V-phase voltage value Vv1 of the first V-phase motor bus bar 60v, and the first W-phase voltage value Vw1 of the first W-phase motor bus bar 60w, that is, a change in the status of power supply to the three-phase first motor bus bar 60. The first control circuit 32 detects short circuits of at least two of the first U-phase motor bus bar 60u, the first V-phase motor bus bar 60v, and the first W-phase motor bus bar 60w when at least two phases of the first U-phase voltage value Vu1, the first V-phase voltage value Vv1, and the first W-phase voltage value Vw1 remain at the same potential for a predetermined time period. Accordingly, the first control circuit 32 can detect entry of water into the motor housing 24 of the motor device 20 when at least two of the first U-phase voltage value Vu1, the first V-phase voltage value Vv1, and the first W-phase voltage Vw1 remain at the same potential for a predetermined time period.

(2) In a comparative example, a motor device has an arrangement such that the first control circuit 32 and the second control circuit 33 are submerged before the first control circuit 32 and the second control circuit 33 detect a short circuit. In this case, since the first control circuit 32 and the second control circuit 33 are submerged before the first control circuit 32 and the second control circuit 33 detect a short circuit, the motor 21 may stop without being controlled by the first control circuit 32 or the second control circuit 33. Further, in the case where the first control circuit 32 and the second control circuit 33 are submerged before the first control circuit 32 and the second control circuit 33 detect a short circuit, even if the first control circuit 32 and the second control circuit 33 still operate, a situation may occur in which the motor 21 is driven in an unexpected direction due to an incorrect detection of a state quantity used for controlling the motor 21.

In contrast, in the present invention, the first control circuit 32 and the second control circuit 33 can detect a short circuit, that is, entry of water into the motor housing 24 of the motor device 20, before the first control circuit 32 and the second control circuit 33 are submerged. Therefore, the occurrence of the situation described above can be prevented. Thus, since entry of water into the motor housing 24 of the motor device 20 can be detected, it is possible to control driving of the motor 21 even after detection of entry of water. Therefore, for example, a control operation such as fail-safe processing can be executed.

(3) In the present embodiment, the first U-phase motor bus bar 60u, the first V-phase motor bus bar 60v, and the first W-phase motor bus bar 60w of the first motor bus bar 60 are aligned in the direction orthogonal to the gravity direction. Accordingly, in the present embodiment, it is possible to minimize an increase in the size of the motor 21 in the radial direction, compared to the case where the first U-phase motor bus bar 60u, the first V-phase motor bus bar 60v, and the first W-phase motor bus bar 60w are aligned in the gravity direction. Further, in the present embodiment, the second U-phase motor bus bar 70u, the second V-phase motor bus bar 70v, and the second W-phase motor bus bar 70w of the second motor bus bar 70 are aligned in the direction orthogonal to the gravity direction. Accordingly, in the present embodiment, it is possible to minimize an increase in size in the radial direction of the motor 21, compared to the case where the second U-phase motor bus bar 70u, the second V-phase motor bus bar 70v, and the second W-phase motor bus bar 70w are aligned in the gravity direction.

(4) When the first motor bus bar 60 is submerged in the water that has entered the motor housing 24 of the motor device 20, the first motor bus bar 60 is submerged before the first motor coil 43a is submerged because the first motor bus bar 60 is disposed on the lower side with respect to the first motor coil 43a in the gravity direction. Therefore, the first control circuit 32 can detect short circuits of the first motor bus bar 60 and the second motor bus bar 70 based on a change in the status of power supply to the first motor bus bar 60, before the first motor coil 43a and the second motor coil 43b are submerged.

(5) When the motor bus bars are submerged in the water that has entered the motor housing 24 of the motor device 20, the first motor bus bar 60 disposed on the lower side with respect to the second motor bus bar 70 in the gravity direction is submerged before the second motor bus bar 70 is submerged. Therefore, the first control circuit 32 can detect entry of water into the motor housing 24 of the motor device 20 before the second motor bus bar 70 is submerged, based on a change in the status of power supply to the first motor bus bar 60 disposed on the lower side with respect to the second motor bus bar 70 in the gravity direction, that is, a change in the first U-phase voltage value Vu1, the first V-phase voltage value Vv1, and the first W-phase voltage value Vw1. Further, there are cases where the second motor bus bar 70 is not yet submerged even when a short circuit due to submergence of the first motor bus bar 60 is detected. In such a case, if the second motor bus bar 70 operates normally, it is possible to continue to control driving of the motor 21 through the second motor bus bar 70. In this way, the motor 21 can continue to assist the driver in steering until the second control circuit 33 or the second motor bus bar 70 is submerged.

(6) The first control circuit 32 and the second control circuit 33 performs determination processing for detecting entry of water into the motor housing 24 of the motor device 20, using the determination processing for detecting short circuits of the first U-phase motor bus bar 60u, the first V-phase motor bus bar 60v, and the first W-phase motor bus bar 60w. Therefore, it is possible to prevent an increase in the number of control elements for detecting entry of water into the motor housing 24 of the motor device 20.

(7) In the case where an arrangement in which water easily enters the motor housing 24 of the motor device 20 is employed, it is effective to have a water entry detection circuit capable of detecting entry of water into the motor housing 24 of the motor device 20 before the first control circuit 32 and the second control circuit 33 are submerged.

(8) The rack housing 13 includes the rack boots 19a that are less waterproof than the watertight structure of the motor housing 24 of the motor device 20. Therefore, entry of water into the motor housing 24 of the motor device 20 is less likely to occur than entry of water into the rack housing 13 through the rack boots 19a.

(9) Since the first motor bus bar 60 is connected to the lowermost point of the circuit board 31, the first motor bus bar 60 is submerged first when the circuit board 31 is submerged. Thus, with this arrangement, entry of water into the motor housing 24 of the motor device 20 can easily be detected.

The above embodiment may be modified as described below. Also, embodiments described below may be combined with each other as long as no technical inconsistency arises.

The communication unit of the first control circuit 32 and the communication unit of the second control circuit 33 may be configured not to communicate with each other, such that information held by the first control circuit 32 and information held by the second control circuit 33 are not shared with each other. In this case, the first control circuit 32 and the second control circuit 33 individually obtain the voltage value of each phase, and individually determine a short circuit of the first motor bus bar 60 and a short circuit of the second motor bus bar 70.

Although motor bus bars of two systems having the first motor bus bar 60 and the second motor bus bar 70 are used, motor bus bars of three or more systems (multiple systems) may be used. Alternatively, a motor bus bar of a single system may be used.

Figure 6:
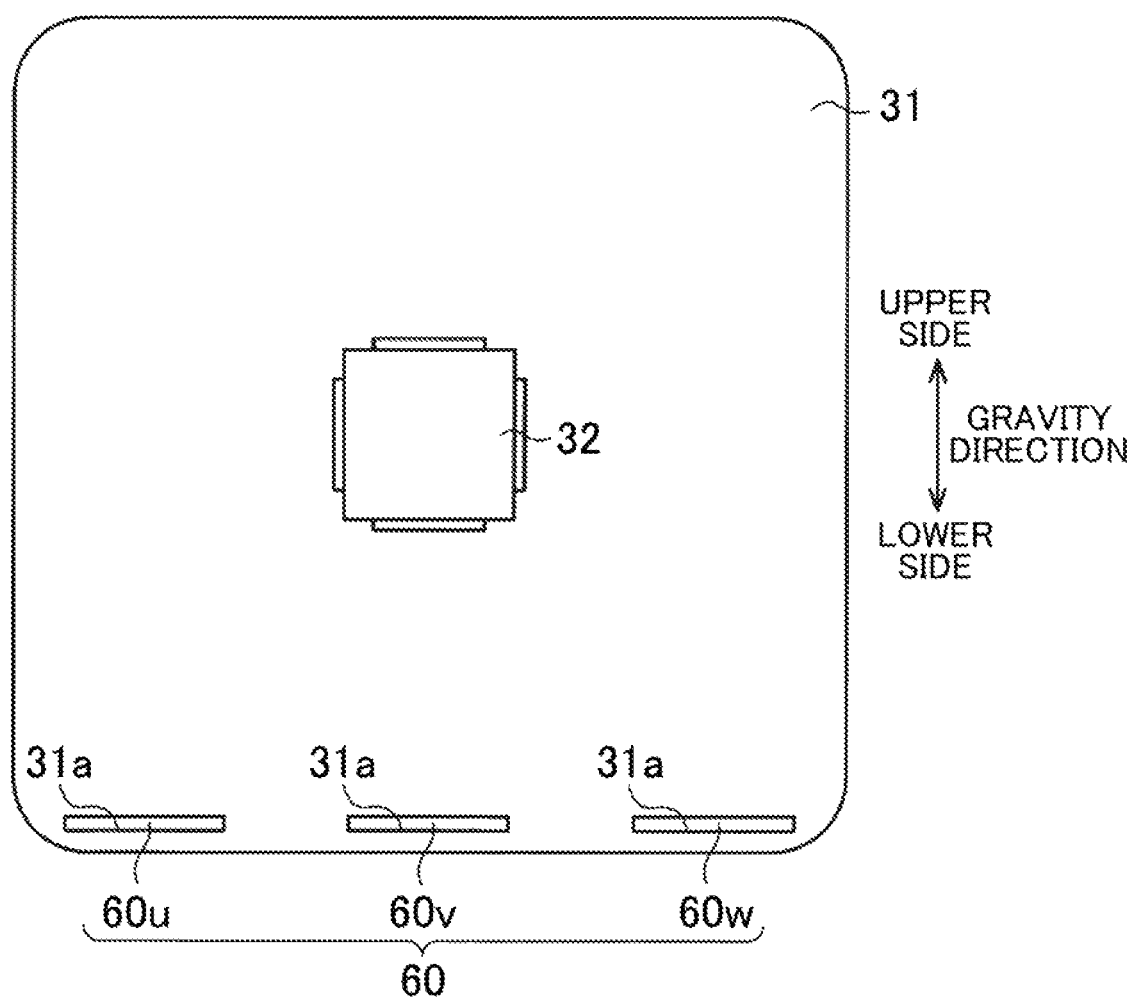
FIG. 6 is a schematic configuration diagram illustrating a control circuit mounted on a circuit board and a motor bus bar as viewed in the axial direction of a rotary shaft in another embodiment.

For example, as illustrated in FIG. 6, only the first motor bus bar 60 and the first control circuit 32 may be provided. In this case, a short circuit of the first motor bus bar 60 can be detected before the first control circuit 32 is submerged. Therefore, it is possible to control driving of the motor 21 even after detection of entry of water.

The motor 21 may be a brushed motor. In this case, each of the first motor bus bar 60 and the second motor bus bar 70 is a two-phase motor bus bar.

The first motor coil 43a may be disposed on the radially outer side with respect to the first motor bus bar 60. Also, the second motor coil 43b may be disposed on the radially outer side with respect to the second motor bus bar 70. The notification device 100 may notify of occurrence of an abnormality with sound.

The arrangement of the first motor bus bar 60 and the second motor bus bar 70 may be appropriately changed. For example, the first U-phase motor bus bar 60u, the first V-phase motor bus bar 60v, and the first W-phase motor bus bar 60w of the first motor bus bar 60 may be aligned in the gravity direction. Alternatively, two of the first U-phase motor bus bar 60u, the first V-phase motor bus bar 60v, and the first W-phase motor bus bar 60w may be disposed on the lower side with respect to the remaining one motor bus bar in the gravity direction. Further, the second U-phase motor bus bar 70u, the second V-phase motor bus bar 70v, and the second W-phase motor bus bar 70w of the second motor bus bar 70 may be aligned in the gravity direction. The second motor bus bar 70 may be disposed on the lower side with respect to the first control circuit 32 and the second control circuit 33 in the gravity direction.

The EPS 1 may be implemented as an EPS in which the axes of the rotary shaft 21a of the motor 21 and the rack shaft 12 cross each other. In this case, the rotary shaft 21a of the motor 21 extends in a direction crossing the gravity direction. The EPS 1 may be implemented as an EPS in which the axes of the rotary shaft 21a of the motor 21 and the rack shaft 12 are orthogonal to each other. In this case, the rotary shaft 21a of the motor 21 extends in the same direction as the gravity direction. The EPS 1 may be implemented as an EPS in which the rotary shaft 21a of the motor 21 is mechanically coupled to the rack shaft 12 via a speed reduction mechanism including a worm gear and a worm wheel. In this case, the rotary shaft 21a of the motor 21 may extend in a horizontal direction orthogonal to the gravity direction, or may extend so as to be tilted from the horizontal direction. Even in these cases, the first motor bus bar 60 has only to be disposed on the lower side with respect to the first control circuit 32 and the second control circuit 33 in the gravity direction.

The motor device 20 may be disposed on the upper side with respect to the rack shaft 12 in the gravity direction, or may be disposed on the same position as the rack shaft 12 in the gravity direction. Further, the motor device 20 may be installed in a steer-by-wire steering system.

What is claimed is:

1. A motor device comprising:
    a motor including a rotary shaft;
    motor bus bars of a plurality of phases that serve as power supply paths to the motor;
    a control circuit that controls power supply to the motor through the motor bus bars; and
    a housing that accommodates the motor bus bars and the control circuit; wherein
    predetermined ones of the motor bus bars of at least two of the plurality of phases are disposed further than the control circuit from the rotary shaft relative to a direction orthogonal to the rotary shaft when the motor device is mounted on a mounting target; and
    the control circuit includes a water entry detection circuit that detects entry of water into the housing, based on a change in a status of power supply to the predetermined ones of the motor bus bars.

2. The motor device according to claim 1, wherein the predetermined ones of the motor bus bars are aligned in a direction substantially parallel to the rotary shaft.

3. The motor device according to claim 1, wherein
    the motor includes a rotor and a stator, the rotor having magnets and being fixed to the rotary shaft to be rotatable with the rotary shaft, the stator having coils and being disposed around an outer periphery of the rotor with a clearance between the outer periphery of the rotor in a radial direction; and
    the predetermined ones of the motor bus bars are disposed further than the coils from the rotary shaft relative to the direction orthogonal to the rotary shaft.

4. The motor device according to claim 1, further comprising:
    motor bus bars of a plurality of systems, the motor bus bar of each of the systems including the motor bus bars of the plurality of phases; wherein
    the motor bus bar of at least one of the plurality of systems is disposed further than the motor bus bar of another of the plurality of systems from the rotary shaft relative to the direction orthogonal to the rotary shaft.

5. The motor device according to claim 1, further comprising:
    a substrate to which the motor bus bars of the plurality of phases and the control circuit are connected; wherein
    the substrate is disposed along the direction orthogonal to the rotary shaft, and the predetermined ones of the motor bus bars are connected to a point of the substrate furthest away from the rotary shaft relative to the direction orthogonal to the rotary shaft.

\* \* \* \* \*